March 17, 1953 — H. D. VAN SCIVER, II — 2,631,478
ROLL DRESSING MEANS
Filed July 22, 1949
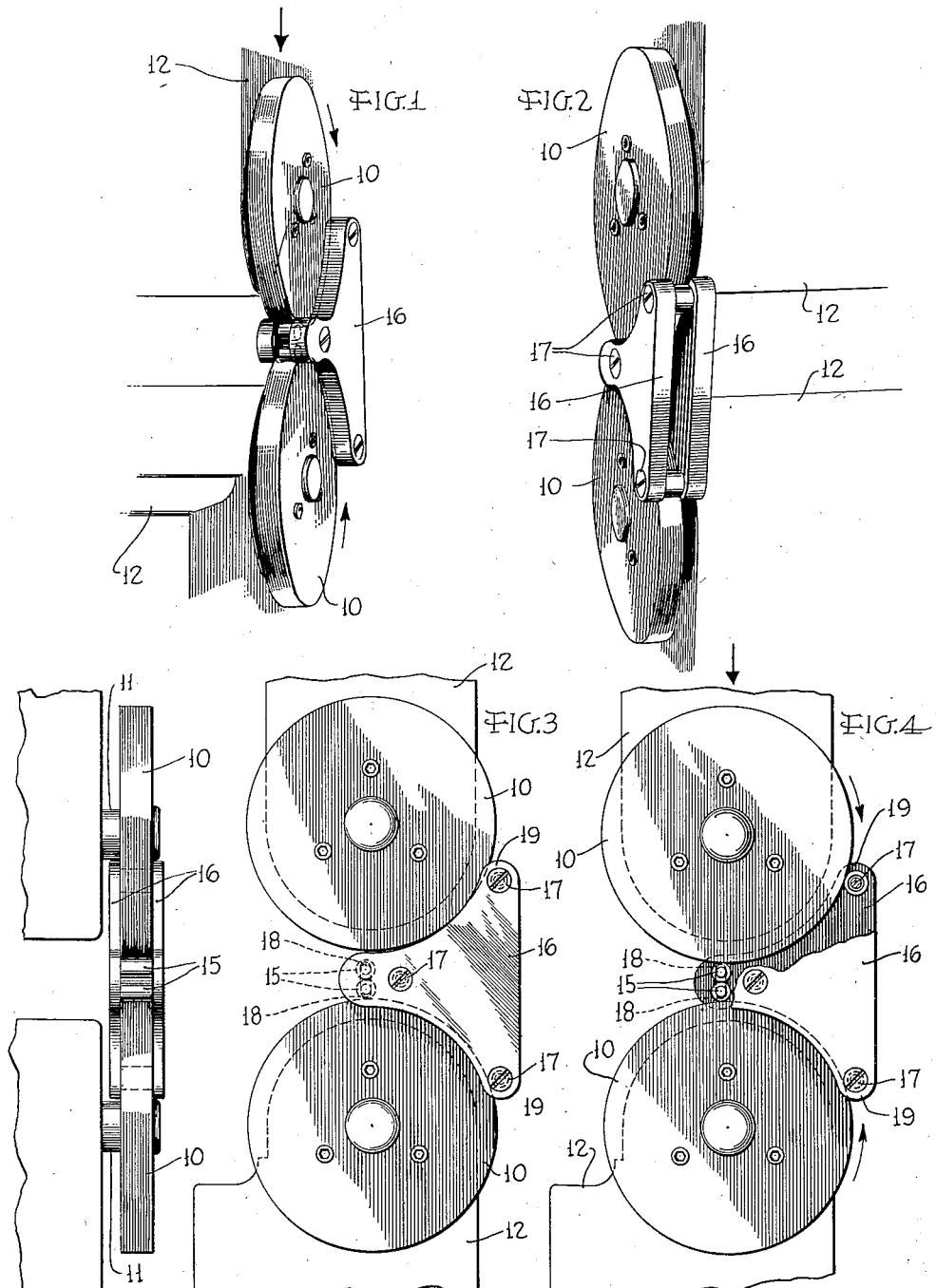
INVENTOR.
Herbert D. Van Sciver II
BY
Maurice A. Crews
ATTORNEY Patented Mar. 17, 1953

2,631,478

UNITED STATES PATENT OFFICE 2,631,478

ROLL DRESSING MEANS

Herbert D. Van Sciver II, Merion, Pa., assignor to The Budd Company, Philadelphia, Pa., a corporation of Pennsylvania Application July 22, 1949, Serial No. 106,118

3 Claims. (Cl. 76—4)

This invention relates to work roll dressing means for keeping the working faces of welding rolls in good working condition, and has for an object the provision of improvements in this art.

When work rolls, for example welding rolls, operate, especially on a narrow seam, they tend to become pitted or ridged and to mushroom out on the sides. Besides the surface irregularities produced in the roll material, there may also be an accumulation of extraneous metal or other foreign material on the roll surface which reduces the effectiveness of the rolls for welding purposes. These difficulties which are experienced to some extent in resistance welding where the rolls can be water-cooled on the outer surfaces where they engage the work, are greatly accentuated in mash welding where the rolls keep the metal between them at a welding temperature and squeeze the material to forge a continuous weld and where, of course, a cooling fluid cannot be used on the outer surfaces of the welding rolls.

In the past there have been various methods and apparatus for keeping the roll surfaces in good working condition. In one of these prior methods there have been provided external presser rolls which rode continuously on the surfaces of the welding rolls to compact, smooth and harden them. Sometimes the presser dressing rolls were knurled to improve their action, particularly in removing scale or extraneous material. Such external presser rolls, however, have many disadvantages, the principal one probably being the complex apparatus required to keep the dressing rolls properly pressed against the welding rolls. Another is the undue amount of wear which the dresser rolls themselves by their constant action produced on the welding rolls.

In some cases relief has been sought instead of a remedy, as by reciprocating the welding rolls axially to distribute the wear across their faces, but this also requires complex apparatus and has only an ameliorating effect and eventually the rolls have to be dressed anyway.

According to the present invention, pressure dressing rolls are provided but these dressing rolls are placed between the welding rolls when they are not being used for welding and the pressure which is normally exerted on the welding rolls for welding is utilized to squeeze the dressing rolls between them whereby with rotation of the welding rolls in the same manner as for welding but, of course with the current cut off, they, in effect, dress themselves. Two small dressing rolls are provided, these being small enough to enter between the welding rolls when opened and to exert a large unit area pressure on the welding rolls whereby to work their surfaces, and these dressing rolls roll against each other as well as against the welding rolls which squeeze down when again closed together with the dressing rolls between them.

One embodiment of the invention is illustrated in the accompanying drawings, wherein:

Fig. 1 is a perspective view from one side of a roller welding machine with the dressing device applied to the work rolls;

Fig. 2 is a similar perspective view taken from the other side of the machine;

Fig. 3 is an outer end elevation with the welding rolls separated and the dresser rolls inserted between them;

Fig. 4 is a view similar to Fig. 3 but with the welding rolls closed and showing part of the dresser roll attachment in section; and Fig. 5 is a full side elevation looking in the same general direction as in Fig. 1.

The machine includes rotatable pressure welding rolls 10 mounted on suitable shafts 11 carried by frame elements 12, one or both of which may be moved from and toward the other. Any suitable power rotating and pressing means common in the art may be employed. Arrows indicate the presence of rotating and pressure means.

The welding rolls may be moved together to engage thin material between them under pressure or may be moved apart a considerable distance to clear projections on the work pieces. The space thus formed (Fig. 3) is wide enough to permit two hardened dressing rolls 15, as of steel or other hard material, to be inserted between them. When the welding rolls are closed under pressure they clamp the dressing rolls between them with enough force to cause the welding rolls to be smoothed and hardened by cold-working as they rotate.

Means are provided for holding the dressing rolls 15 in position between the welding rolls, the mounting means hereby provided comprising spaced plates 16 closely embracing but not binding the ends of the rolls. These plates are held together by spacing and retaining elements 17. The plates provide for the dressing rolls oversized end bearings or retaining openings 18 which keep the dressing rolls from falling out and hold them in line the one above the other but permit them to be squeezed together even if they wear to some extent.

The outer spacing and retaining elements 17 which are spaced furthest apart may be drawn in as the rolls rotate until they engage the roll peripheries, as shown in Fig. 4, and prevent the dressing rolls from being drawn through the welding rolls by rotation. If desired, loose idler rolls may be provided on these outer spacing elements but if the welding roll diameters are close to that for which the dressing tool is designed there will be very little force exerted here and idler rolls will not be necessary.

The side plates 16 carry means, such as hardened and sharpened edges 19, which cut off any material on the peripheries of the rolls which may tend to mushroom over the end edges.

The device is herein shown to be made as a separable unit which may be introduced and removed as needed, but may be mounted as a movable part of the machine which is adapted to be moved into and out of roll dressing position as desired. It has been found to be very effective in use, restoring a smooth hard surface to welding rolls in a few rotations.

Preferably the axes of the welding rolls and the axes of the dressing rolls all fall substantially on a single common plane or a straight line drawn through the axis so that, except for rotation of the welding rolls, there is no tendency for the dressing roll axes to move in either direction off this line or plane of centers. In the illustrated example the dressing rolls enter slightly further between the welding rolls so as to assume a stable position when the welding rolls are pressed together, whether they are then being rotated or not. The elements 17 press against the welding rolls to maintain the dressing rolls in proper position at this time, with a vise-like gripping action exerted on them by the welding rolls.

In operation, the welding rolls run close together on the work in the normal manner for welding until their surfaces become unconditioned for good welding. When this condition is reached, the work is removed and the rolls are separated from each other as far as they will move and the dressing rolls are inserted between them at least up to the line-of-centers position and thereafter the welding rolls are re-closed under pressure, as for welding. In this movement the action on the elements 17 coupled with the rotation of the rolls, which is now started, will bring the dressing rolls in or out relative to the line of centers until they assume the proper working position, and thereafter by continued rotation of the welding rolls the dressing operation is performed. After dressing, the dressing roll device is removed by separating the welding rolls and the welding rolls again used for normal welding operations.

What is claimed is:

1. A roll dressing device adapted to be applied between a pair of cooperating rotatable work rolls which are mounted and arranged to be separated or brought together under pressure, said device comprising a frame having sides spaced apart at such distance as to embrace the ends of the work rolls, a pair of hard idler dressing rolls mounted in said frame in position to roll upon each other and to fit in the bite between said work rolls when separated and to be rotated therebetween when the work rolls are brought together upon them under pressure and rotated, and means on said frame located at a distance from the dressing rolls and in a position to engage the peripheries of said work rolls outside the bite zone to hold said dressing rolls in proper position in the bite between said work rolls with the axes of the work rolls and dressing rolls approximately in a common plane.

2. A roll dressing device adapted to be applied between a pair of cooperating rotatable work rolls which are mounted and arranged to be separated or brought together under pressure, said device comprising a frame having sides spaced apart at such distance as to embrace the ends of the work rolls, a pair of hard idler dressing rolls mounted in said frame in position to roll upon each other and to fit in the bite between said work rolls when separated and to be rotated therebetween when the work rolls are brought together upon them under pressure and rotated, and means on said frame located at a distance from the dressing rolls and in a position to engage the peripheries of said work rolls outside the bite zone to hold said dressing rolls in proper position in the bite between said work rolls with the axes of the work rolls and dressing rolls approximately in a common plane, the sides of said frame having sockets to receive end journal portions of said dressing rolls and providing free movement of at least one of the dressing rolls from and toward the other whereby the dressing rolls are made to roll against each other to take the pressure applied by the work rolls.

3. A roll dressing device adapted to be applied between a pair of cooperating rotatable work rolls which are mounted and arranged to be separated or brought together under pressure, said device comprising a frame having sides spaced apart at such distance as to embrace the ends of the work rolls, a pair of hard idler dressing rolls mounted in said frame in position to roll upon each other and to fit in the bite between said work rolls when separated and to be rotated therebetween when the work rolls are brought together upon them under pressure and rotated, and means on said frame located at a distance from the dressing rolls and in a position to engage the peripheries of said work rolls outside the bite zone to hold said dressing rolls in proper position in the bite between said work rolls with the axes of the work rolls and dressing rolls approximately in a common plane, the sides of said frame closely embracing the ends of said work rolls and having cutting edges at the peripheries of the work rolls for trimming off material which spreads out beyond the ends of the work rolls.

HERBERT D. VAN SCIVER II.

REFERENCES CITED

The following references are of record in the file of this patent:

UNITED STATES PATENTS

| Number | Name | Date |
|---|---|---|
| 165,927 | Helm | July 27, 1875 |
| 408,521 | Quackenbush | Aug. 6, 1889 |
| 1,044,006 | Boche | Nov. 12, 1912 |
| 1,463,036 | Bryen | July 24, 1923 |
| 1,773,737 | Lindquist | Aug. 26, 1930 |
| 1,776,436 | Iversen | Sept. 23, 1930 |
| 1,797,624 | Sjolander | Mar. 24, 1931 |
| 2,467,027 | Glaudis | Apr. 12, 1949 |
| 2,467,091 | O'Neill | Apr. 12, 1949 |

FOREIGN PATENTS

| Number | Country | Date |
|---|---|---|
| 310,822 | Italy | Sept. 8, 1933 |
| 551,107 | Great Britain | Mar. 9, 1942 |